United States Patent [19]

DeTorre

[11] 3,865,673
[45] Feb. 11, 1975

[54] METHOD OF PSEUDOSUBSURFACE SCORING AND CUTTING GLASS SHEETS AND SHEET CUT THEREBY

[75] Inventor: Robert P. DeTorre, Pittsburgh, Pa.

[73] Assignee: Moline Limited, London, England

[22] Filed: Nov. 20, 1973

[21] Appl. No.: 417,649

Related U.S. Application Data

[63] Continuation-in-part of Ser. No. 242,510, April 10, 1972, abandoned.

[52] U.S. Cl................ 161/1, 65/105, 65/113, 65/176, 225/2, 225/93.5, 225/96.5
[51] Int. Cl.............................................. C03b 33/00
[58] Field of Search ............ 65/112, 113, 174, 175, 65/176, 97, 105; 225/2, 93.5, 96.5; 161/1

[56] References Cited
UNITED STATES PATENTS
3,795,572  3/1974  DeTorre .......................... 65/113 X

FOREIGN PATENTS OR APPLICATIONS
1,096,561  12/1967  Great Britain ...................... 65/112

Primary Examiner—Arthur D. Kellogg
Attorney, Agent, or Firm—Thomas F. Shanahan

[57] ABSTRACT

Pieces of flat glass are cut to desired size without the necessity of grinding to size and polishing. Edges of the piece are cut in accordance with a procedure involving the use of a large diameter scoring wheel at a greater-than-usual applied pressure, to produce a pseudosubsurface score, followed by the application of heat to the score and/or the application of a bending moment about the score to propagate a fracture in the piece of glass. Light seaming of the top and bottom portions of the edges completes the preparation of those edges.

34 Claims, 15 Drawing Figures

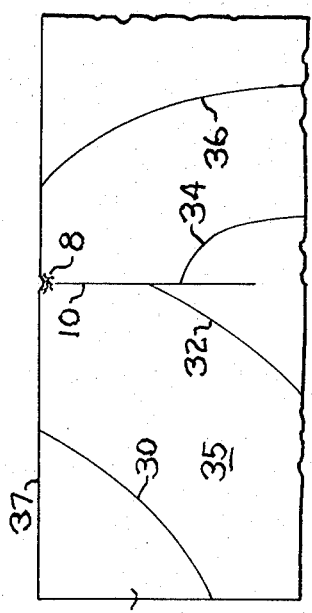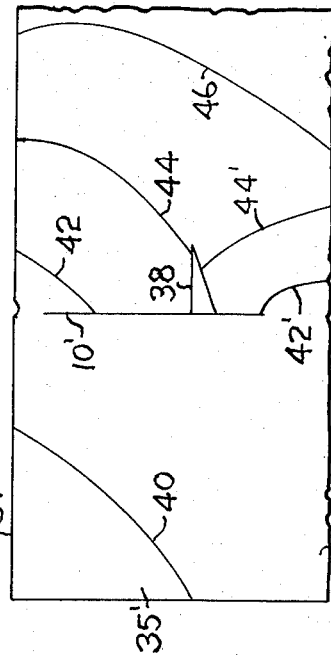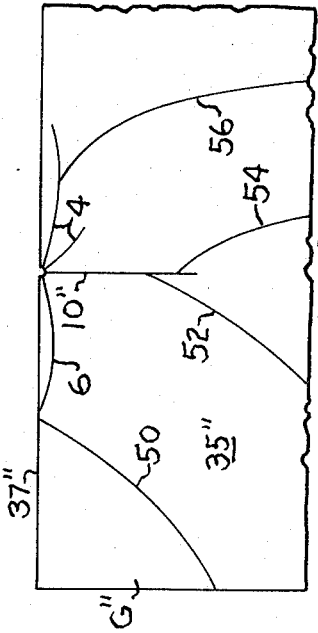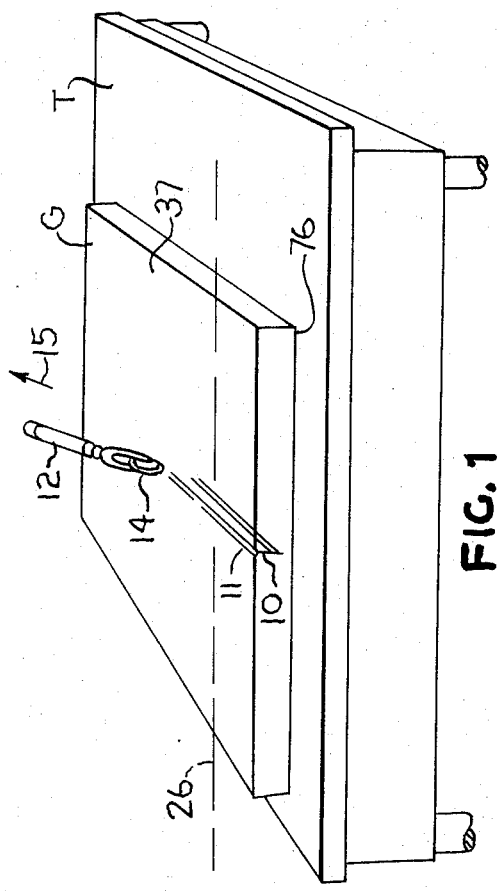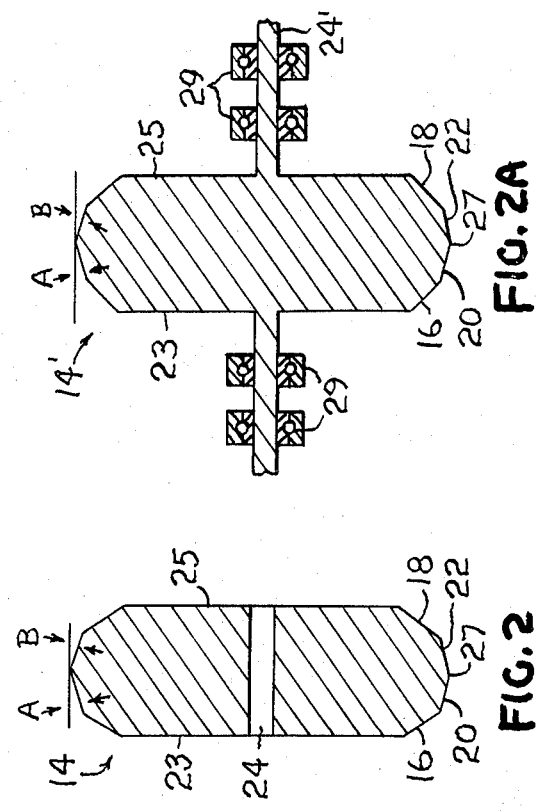

METHOD OF PSEUDOSUBSURFACE SCORING AND CUTTING GLASS SHEETS AND SHEET CUT THEREBY

CROSS-REFERENCE TO RELATED APPLICATIONS

This application is a continuation-in-part of copending Application Ser. No. 242,510, filed Apr. 10, 1972, by Robert P. DeTorre, now abandoned.

BACKGROUND OF THE INVENTION

1. Field of the Invention

This invention relates to glass articles and to a method and an apparatus for producing said glass articles, and in particular, for the manufacture of architectural panels, furniture tops and other relatively thick glass articles, for example, in excess of 3 to 10 millimeters (especially in the range of 18 to 36 millimeters or above), having dimensions such as 4 meters by 8 meters.

2. Description of the Prior Art

In the manufacture of architectural-glass panels and furniture tops of the kind indicated above, it has hitherto been common to obtain panels of a desired size by hand scoring and mechanical snapping of the glass to yield a piece somewhat greater in its dimensions than the final size desired, followed by the grinding of the cut edges of the piece to the desired size and the polishing of the ground edges. The grinding and polishing are time-consuming and costly operations, but they have hitherto been considered necessary, particularly in cutting glass sheets of substantial thickness.

It is important that architectural panels exhibit adequate edge strength. When tested in accordance with the conventional beam-loading test, the ground-and-polished edges of a 4-meter by 8-meter sheet, approximately 18 millimeters thick, produced by a process including the steps of normal scoring, snapping, grinding and polishing, exhibit strength values such as about 4.6 to 4.9 kilograms per square centimeter. Panels exhibiting values substantially lower than about 4 kilograms per square centimeter are noticeably more susceptible to breakage.

U.S. application Ser. No. 57,584, filed July 23, 1970, and U.S. application Ser. No. 68,735, filed Sept. 1, 1970, both now abandoned and replaced by allowed U.S. application Ser. No. 257,104 and No. 257,130, filed May 26, 1972, by Robert P. DeTorre, now U.S. Pat. No. 3,795,572 and U.S. Pat. No. 4,795,502, disclose a cutting procedure that involves the application of a surface deep score under relatively high pressure by a large-diameter, blunt scoring wheel, followed by the propagation of the score into a fracture and a light seaming operation on the top and bottom portions of the edges of the glass so cut. These applications are incorporated herein by reference.

SUMMARY OF THE INVENTION

According to the present invention, a glass article is produced having a top surface, a bottom surface and a cut edge extending therebetween in a direction substantially perpendicular to the top surface and the bottom surface. The cut edge has a series of fine undulatory ridges, serrations or fissures adjacent to one of the surfaces and spaced therefrom by a zone of damaged but essentiall spall- or wing-free glass. These undulations or serrations are indicative of the extent of a pseudosubsurface deep score that was placed in the glass article to cut the article along the edge. Light seaming removes sharp corners between the edge and each of the major surfaces, and it also removes the serrations.

As used in this application, the terms "subsurface crack" or "subsurface score" refer to an essentially spall- or wing-free discontinuity or fissure, such as an intentionally induced crack or score, respectively, that is within the thickness of a piece of glass and extends substantially perpendicular to its major surfaces but does not extend or connect to either major surface of the piece. The term "pseudosubsurface score" refers to an intentionally induced discontinuity or fissure in a piece of glass that extends substantially perpendicular to its major surfaces, that does not appear itself to extend or connect to either major surface of the piece but which is accompanied by a microscopic zone of damaged, essentially spall- or wing-free glass which is disposed between or extends between its tip end and a major surface of the piece. The term "surface score," on the other hand, refers to a substantially perpendicular discontinuity in a piece of glass that extends or connects to a major surface of the piece and is bordered at said major surface by wing and/or spalled glass.

In accordance with the present invention, a glass article is produced by a process and an apparatus which avoids the use of grinding to size and edge polishing. The process includes the imposition of a pseudosubsurface deep score along an intended path of cut into the piece of glass and the projection of the score deeper into or through the thickness of said piece by a separate, nonsimultaneous step, such as the application of heat to the score and/or the application of a bending moment about the score. The apparatus for performing this procedure consists of a large-diameter scoring wheel, such as, for example, at least approximately 12 millimeters, and preferably between approximately 19 and 200 millimeters, in diameter, having a blunt cutting angle, such as, for example, between approximately 155° and 165° at high forces, such as, for example, approximately 30 kilograms to approximately 900 kilograms, and even greater. Relatively light seaming of the top and bottom portions of the cut edge yields cut edges that are substantially as strong or stronger than conventional ground-and-polished edges and edges produced by a surface deep-scoring process. In addition, less seaming is required in a pseudosubsurface deep-scored cut edge than in a surface deep-scored cut edge due to the essential absence of spall or wing in pseudosubsurface deep scores. Further, the serrations or fissures in pseudosubsurface scores protrude from the cut edge by a distance that is only about one-half that of the serrations in surface deep scores.

Accordingly, it is an object of the present invention to produce cut edges that are smooth, strong, straight, pristine and perpendicular to the major surfaces of the piece of glass.

It is a further object of the present invention to produce such edges while avoiding the use of grinding and polishing.

It is a further object of the present invention to provide a method and apparatus for cutting all glass, and in particular, glass in excess of approximately 10 millimeters in thickness by a relatively uncomplicated procedure that involves the application of a pseudosubsurface deep score, followed by the application of heat to the score and/or a bending moment about the score and a small amount of seaming.

It is a further object of the present invention to produce a cut edge that is at least equal in quality to those produced by surface deep scoring, with a lesser amount of seaming.

It is a further object of the present invention to find a practical means for generating a continuous score that will weaken a sheet of flat glass to the extent necessary so that it may be severed without incurring surface crushing or edge damage.

DESCRIPTION OF THE DRAWINGS

A complete understanding of the following invention may be obtained from the foregoing and following description thereof, taken together with the appended drawings, which are not drawn to scale unless noted, and in which:

FIG. 1 is a diagrammatic view of a scoring apparatus applying a pseudosubsurface deep score to a piece of flat glass;

FIG. 2 is a vertical cross-sectional view of a cutting wheel used to produce pseudosubsurface scores;

FIG. 2A is a vertical cross-sectional view of a particular cutting wheel used to produce subsurface scores or cracks;

FIG. 3 is an enlarged end view of the pseudosubsurface deep score;

FIG. 3A is an enlarged end view of a subsurface score or crack;

FIG. 4 is an enlarged end view of a surface deep score;

DESCRIPTION OF THE PREFERRED EMBODIMENT

Figure 5:
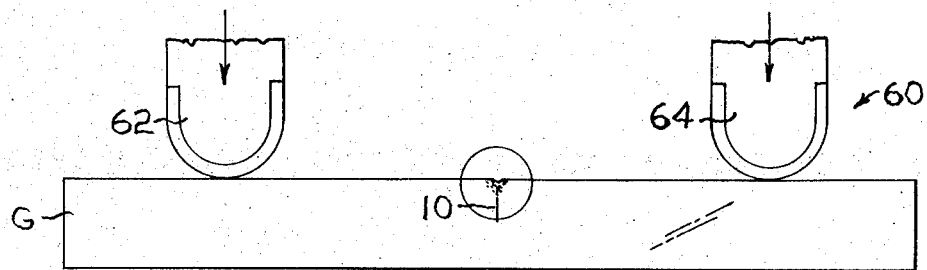
FIG. 5 is an elevation view of a snapping apparatus in position to apply a bending moment about the pseudosubsurface deep score.
Figure 5A:
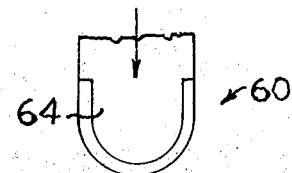
FIG. 5A is an enlarged view of the encircled area in FIG. 5 at 180 times magnification.

Referring to FIG. 1, an apparatus 12 is shown applying a pseudosubsurface deep score 10 to a central portion of a piece of glass G along an intended path of cut and in a direction 15 that is substantially parallel to top surface 37 and bottom surface 76, while the glass is supported on a table T. At least a substantial portion of score 10 is spaced from top surface 37 along the length of score 10 by a zone of damaged, substantially spall- or wing-free glass. Apparatus 12, including a scoring or cutting wheel 14, is shown moving from one end of glass G to the other end in the direction of arrow 15 to apply the pseudosubsurface deep socre 10. One skilled in the art will appreciate that there are many commercially available devices for housing scoring wheel 14. It is well known, for example, to supply the necessary scoring pressure to a cutting wheel by means of a fluid pressure such as air or hydraulic fluid. Further, U.S. application Ser. No. 128,384, filed on Mar. 26, 1971, by David A. Bier, now U.S. Pat. No. 3,760,997, suggests that a cutting wheel may be actuated by a constant-reluctance motor means. Any suitable means may be used to supply the load to scoring wheel 14.

A permanent indentation 11 is created in top surface 37 by the wheel 14 directly above score 10. Indentation 11 may be approximately 0.001 millimeter deep and approximately 0.015 millimeter wide. There are two theories relating to the creation of indentation 11. The first theory is that there is plastic flow of the glass from one area to another without any change in total volume of the glass. The second theory is that the glass is compressed or densified with the total volume of the glass being reduced. Theoretically, if the glass is densified (second theory), the index of refraction of the glass will be altered, but if the glass flows plastically (first theory), the index of refraction will not be altered. Experimental results indicate that the index of refraction, immediately beneath indentation 11, is approximately 5 percent higher than that of normal glass. This favors the theory that densification occurs beneath the indentation 11, but it does not eliminate the possibility that there is plastic flow or some other phenomenon occurring with or in lieu of densification. However, plastic flow requires deformation in shear, which necessarily involves the breaking of interatomic bonds, and those skilled in the art will recognize that this phenomenon cannot occur in a covalent material, such as glass, unless the material is strained at a temperature from one-half to two-thirds of its melting point. In the present case, there is no positive reason to suspect that the glass is heated to such a degree. In addition, where densification occurs in the glass, tensile stresses are created to assist in severing the glass.

Referring to FIG. 2, there is shown a detailed view of a cutting or scoring wheel 14 made of tungsten carbide or other suitable material of hardness of about 7 or more on Mohs' scale and having a radius in excess of approximately 6 millimeters, and preferably within approximately 9 to approximately 100 millimeters. The base angle, i.e., the angle between the two sides 16 and 18, if extended, is about 120°, and the angle between the sides 20 and 22 (hereafter referred to as the cutting angle) is between approximately 155° and approximately 165°, with approximately 157° to 163° providing optimum results. With cutting angles less than approximately 150°, defects such as spall and wing may occur. The term "spall" may be defined as a chip or flake out of the edge of the piece of glass. The term "wing" may be defined as a lateral crack on either side of a score line, projected outward under the glass surface from the score line by the action of a scoring tool. With cutting wheels having cutting angles between approximately 150° and approximately 155°, surface deep scores are generally produced. Moreover, with cutting angles between approximately 165° and approximately 170°, subsurface deep scores are generally produced. If the cutting angle is greater than approximately 170°, it is extremely difficult to produce any score beneath the apex 27 of the wheel 14. If pressure is applied to a wheel 14 having a cutting angle greater than approximately 170°, until the glass fails, the failure will generally occur adjacent to the point where side 16 meets surface 20, or side 18 meets surface 22. This is probably due to the fact that cutting angles in excess of approximately 170° merely place the glass in compression along the entire width of surface 20 and 22.

The wheel 14 is shown with a central axle hole 24 which functions as a means for rotatably mounting said wheel on a shaft that is passed through the axle hole 24. Hole 24 may be, for example, from 2 to 25 millimeters in diameter. With such a setup, there can be a relatively large amount of friction between the cutting wheel and its holder, and for this reason, this type of wheel will hereinafter be referred to as a "high friction wheel". Wheel 14 may be, for example, 19 millimeters in diameter and urged into contact with a piece of glass G that is approximately 19 millimeters thick at a force of approximately 175 kilograms, to produce a pseudosubsurface score that starts approximately 0.01 millimeter from the top surface 37 of glass G and extends for approximately 2 to 2.5 millimeters into the thickness of glass G. Scores so produced correspond to the intended location of the edge of the finished piece. To guide the scoring apparatus, a straight-edge member may be secured to the glass G as is conventional in prior-art scoring.

Referring to FIG. 2A, there is shown a wheel 14' that is similar to wheel 14 except that wheel 14' has an integral shaft 24' instead of hole 24. The shaft 24' may be mounted in bearings, such as ball bearings 29, to minimize, or even eliminate, friction between the wheel and its holder. This is significant for reasons discussed hereinbelow. This type of wheel will hereinafter be referred to as a "low friction wheel."

Although a preferred embodiment of the present invention incorporates a cutting wheel or disc, other means will become apparent to carry out the present invention. For example, one may wish to construct a member that comprises a continuous chain forming a curved cutting edge rather than a wheel. It would still be necessary to maintain both the blunt cutting angles and the high pressures described herein. It is also necessary to maintain the effective radius of the continuous chain within the above-mentioned range. For example, continuous chain could take the path of an oval, but the radius of the oval at the point of contact with the chain and the glass (effective radius) should be within the same range as the radius (or effective radius) of a cutting wheel.

It is important to note the importance of orienting the scoring wheel such that sides 23 and 25 are substantially perpendicular to the surface of the glass to be cut. The pseudosubsurface crack or score generally extends in the same direction as the cutting wheel. Therefore, if the cutting wheel is not perpendicular to the glass surface, the resultant pseudosubsurface crack or score will not be perpendicular. Referring to FIGS. 2 and 2A, angles A and B indicate the angles between the cutting wheel and the glass surface. With the cutting wheel having a cutting angle of 163°, it is preferred that angle A and angle B be maintained at 8.5°.

Referring to FIG. 3, there is shown a partial view, greatly magnified, of a surface 35 that is formed when the piece of glass G has been severed along dashed line 26 in FIG. 1 by running a cut. It should be understood that in a normal cutting operation, the glass is not severed along line 26. This is only done to illustrate a means for detecting either a pseudosubsurface score, a subsurface score or a surface score, as described hereinbelow.

As shown in FIG. 3, pseudosubsurface deep score 10 is located directly beneath the path of wheel 14, starting, for example, at approximately 0.01 millimeter below the top major surface 37 of glass G and extending in a direction that is substantially perpendicular to surface 37 for approximately 2.5 millimeters. However, between the tip of score 10 and surface 37, there can be observed under high magnification a zone of damaged or physically modified but essentially spall- or wing-free glass 8. The zone of glass 8 may be up to about 0.025 millimeter deep and up to about 0.5 millimeter wide but is generally only up to about 0.0215 millimeter deep and up to about 0.25 millimeter wide. Moreover, although "Wallner lines" 30, 32, 34 and 36 indicate that the zone of glass 8 is sufficiently weakened or physically modified such that a crack front intersecting this zone and the adjacent score 10 does not split and form independent Wallner lines, nevertheless the zone of glass 8 is essentially free of spall or wing. Furthermore, the zone of glass 8 remains in place adjacent surface 37 so that surface 37 remains substantially smooth or unblemished. Aside from the physically modified zone 8, score 10 otherwise exhibits all of the desirable characteristics of a subsurface score and is easier to open or snap than a subsurface score. The term Wallner line is used in the art to describe lines on a severed surface that indicate the speed of travel of a fracture front and the direction of fracture propagation as a cut is run.

FIG. 3A is a view similar to FIG. 3, showing how a severed surface 35' would look if a subsurface score 10' was placed in a piece of glass G', and the piece was then severed by running a cut along a plane that is perpendicular to score 10'. Subsurface scores or cracks 10' and the method of producing such scores is fully disclosed in allowed application Ser. No. 242,511, filed Apr. 10, 1972, the disclosure of which is incorporated herein by reference. Mark 38 is peculiar to the inner section of a severed surface 35' with a subsurface discontinuity. It should be understood that mark 38 is not a crack, but merely a slight ridge, caused by fracture propagation from two different locations. Wallner lines 40, 42, 42', 44, 44' and 46 indicate that score 10' does not extend entirely to the top major surface 37' of the piece of glass G, as described more fully hereinbelow.

FIG. 4 is a view similar to FIGS. 3 and 3A, showing how a severed surface 35'' would look if a surface score 10'' was placed in a piece of glass G'', and the piece was then severed by running a cut along a plane that is perpendicular to score 10''. Wallner lines similar to those shown at 50, 52, 54 and 56 will extend across surface 35''. There is no mark (such as mark 38 in FIG. 3A). In addition, there is no apparent in-place zone of damaged or physically modified glass (such as zone 8 in FIG. 3) between the tip of score 10'' and surface 37''. Score 10'', in fact, connects to surface 37'' and there is ample evidence of spall 6 and/or wing 4 bordering the path of score 10''. The above characteristics indicate that the severed surface includes a surface score. Note that Wallner lines 50, 52, 54 and 56 bow toward the bottom right of glass G'' and the top portion of each Wallner line will be farther to the right than the bottom portion. This indicates that a fracture was run from left to right and from top to bottom by a bending moment about the top major surface 37'' of the glass G'' to place it in tension.

It is apparent that the Wallner line pattern in FIGS. 3 and 4 is significantly different from the Wallner line pattern in FIG. 3A. In FIGS. 3 and 4, the fracture propagation starts at 30 and 50, respectively, and moves from left to right. The pattern is similar in FIG. 3A at the start of fracture propagation, as evidenced by Wallner line 40. When the propagation in FIG. 3A reaches subsurface score 10', the original single Wallner line splits into two independent lines 42 and 42'. This is because some of the propagation occurs between the top major surface 37' of the piece of glass G' and the uppermost or tip portion of subsurface score 10' and some of the propagation occurs between the bottommost or root portion of subsurface score 10' and the bottom major surface (not shown in FIG. 3A) of the piece of glass G', as illustrated by Wallner lines 42 and 42', respectively. After both fronts have traveled around the subsurface score, they approach each other, as at 44 and 44', meet at mark 38, and merge to form a single front, as indicated by Wallner line 46. Wallner line 44 is in a plane that is slightly offset from a plane in which Wallner line 44' is located. As a result, where Wallner line 44 meets Wallner line 44', there is a slight protrusion which has been shown as mark 38. By the time the fronts have progressed to Wallner line 46, they have merged into a single front in a common plane. In contrast, the Wallner lines in FIG. 3 do not split at score 10, because of the weakened or physically modified condition of the zone of glass 8, and the Wallner lines in FIG. 4 do not split at score 10'', because score 10'' connects or is open to the surface 37'' of the glass.

Experience indicates that mark 38 is always present in a true subsurface discontinuity, such as a score or crack, pointing in the direction of fracture propagation. This provides a means for establishing whether or not a discontinuity is a true subsurface discontinuity as opposed to a pseudosubsurface discontinuity or a surface discontinuity. It also provides a method for establishing the direction of fracture propagation where one is severing in a plane that intersects a subsurface discontinuity.

Referring to FIG. 5, there is shown an elevation view of a snapping apparatus 60 in position to apply a bending moment about pseudosubsurface deep score 10. The apparatus may consist of two top anvils 62 and 64 and a bottom anvil 66. Glass G may be placed upon a table so that a portion of the pseudosubsurface deep score 10 overlaps the table. A bending moment may be applied at the end of the piece of glass G that overlaps the table to run a cut along the pseudosubsurface deep score 10. It is sometimes difficult, especially with pieces of glass that are relatively long and thick (such as 19-millimeter thick glass in excess of 3 meters in length), to run a cut in the manner described. Under such circumstances, the tapping and/or heating and/or bending moment procedures disclosed in application Ser. No. 257,104 now U.S. Pat. No. 3,795,572, may be employed or a narrow member or plate, approximately 12 millimeters in width, may be placed between the glass and the table, directly beneath the pseudosubsurface score 10. Use of the procedure of application Ser. No. 257,104 broadly involves applying a tap to the bottom of the score to propagate the score deeper into the piece and/or applying heat along the length of the top of the score to propagate the score deeper into the piece, followed by either the application of heat along the bottom of the score to further propagate the score and the application of a bending moment about the score to fracture a remaining thin zone of glass or the application of heat along the bottom of the score to fracture the glass or the application of a bending moment about the score without bottom heating. Alternatively, use of the narrow plate or member places the surface of the piece of glass in tension along the score and reduces the energy necessary to run a cut along the entire length of the piece. In either case, cut edges are produced that are smooth, strong, straight, pristine and perpendicular to the major surfaces of the piece.

After the glass has been snapped, there may be conducted an inspection to determine the quality of the cut that has been opened. In the inspection along the cut edge, looking perpendicularly to the cut edge, it is customary to see a pattern such as that indicated in FIG. 6, when a high friction wheel has made the pseudosubsurface score. The top surface of the glass is there designated with the numeral 37 and the bottom designated with the numeral 76. A short distance below top surface 37 is seen a marking 72 and a marking 74 which indicate the extent of the pseudosubsurface score caused by the cutting wheel. The marking 72 or tip line of the score is generally approximately 0.01 millimeter from the top surface of the glass (this has been exaggerated in FIGS. 6 and 7), and the marking 74 or root line of the score may be approximately 0.5 to 4 millimeters from the marking 72, or even more. FIG. 7 is a magnified view of the encircled portion of the cut edge shown in FIG. 6, further illustrating markings 72 and 74 and showing the undulations or serrations 73 therebetween. Note that each undulation or serration 73 approximates a quarter of a circle and markings 72 and 74 each approximate a straight line that is parallel to top surface 37 and bottom surface 76.

Figure 8:
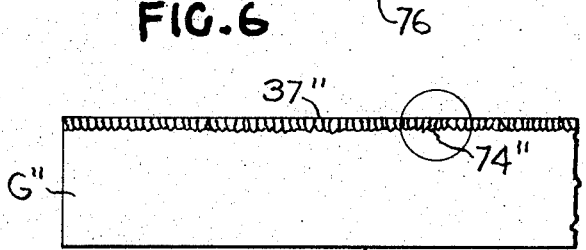
FIG. 8 is an elevation view of an edge of a piece of glass cut in accordance with surface deep-scoring techniques.
Figure 9:
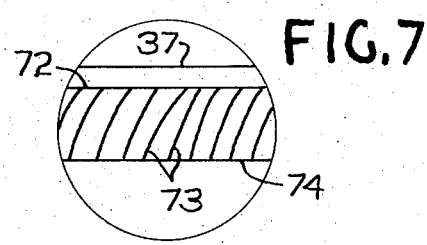
FIG. 9 is an enlarged view of the encircled area in FIG. 8.

Referring to FIG. 8, there is shown a cut edge of the piece of glass G'' that was severed with a surface deep score. The piece of glass G'' has a top surface 37'' and a bottom surface 76''. A surface deep score 10'' extends from top surface 37'' to marking 74''. FIG. 9 is a magnified view of the encircled portion of the cut edge in FIG. 8, further illustrating marking 74'' and showing undulations or serrations 73''. Each undulation or serration 73'' approximates a semi-circle. Note that marking 74 is substantially straight line while marking 74'' is jagged. This is significant since it is often necessary to do additional seaming to remove some of the longer points from marking 74''. Additionally, with surface deep scoring, the undulations or serrations protrude from the glass by approximately 0.25 to 0.5 millimeter, while the undulations or serrations in pseudosubsurface scores are only about one-half of that amount, or approximately 0.125 to 0.25 millimeter. Finally, as described more fully hereinbelow, long wings develop in surface deep scoring when extremely large-diameter wheels are used, but they do not develop in pseudosubsurface or subsurface scoring. For these reasons, pseudosubsurface and subsurface deep scores require substantially less seaming than do surface deep scores.

The inspection further comprises viewing the glass vertically, i.e., in a direction perpendicular to the major surfaces of the sheet of glass, to detect wing or undercut defects. A satisfactory cut exhibits no such defects, or, at the worst, ones so minor as to be removed during a subsequent seaming operation.

As used in this application, the term "pseudosubsurface score" refers to the area between marking 72 and marking 74. The term "weakened zone" refers to the area between top surface 37 and marking 72, and the term "fracture" refers to the area between marking 74 and bottom surface 76.

Figure 12:
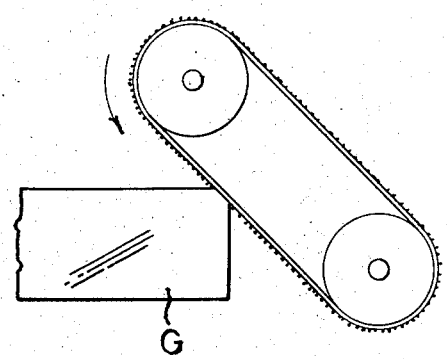
FIG. 12 is a schematic view of an edge or corner portion of a piece of glass being seamed.

As a final step in the process of the present invention, there is conducted a finishing, such as light seaming, of only the upper and bottom portions of the edges of the place of glass so cut. This leaves a smooth edge with no evidence of markings 72 and 74 and undulations or serrations 73. There may be used, as illustrated for example in FIG. 12, a hand-held belt sander using a belt 75 millimeters wide by 600 millimeters long. This is a conventional operation, and it does not require further elaboration or explanation.

The result is that there is produced a finished piece of glass that compares favorably in its edge strength to similar pieces produced by the prior-art method of rough cutting, mechanical snapping, grinding to size, and then polishing. The pieces of the present invention have edge strengths of about 4.4 to about 4.7 kilograms per square centimeter in the conventional beam-loading test, in comparison with strength such as 4.6 to 4.9 kilograms per square centimeter for the prior-art ground-and-polished pieces. Either will meet specifications on customary glazing installations. In achieving the edge-strength values indicated above, the final limited seaming operation is important. Without the final seaming operation, the edge strength is on the order of 3.8 to 4.0 kilograms per square centimeter.

As the glass becomes thicker, it becomes increasingly difficult to produce with a cutting wheel of a given diameter a pseudosubsurface score of the required depth without causing a development of wing. This means that with thicker glass, a larger cutting wheel should be used, and with thinner glass, the use of a somewhat smaller cutting wheel is permissible.

The present invention suggests a process and an apparatus for producing a glass article that is, in many circumstances, superior to any known in the prior art. First, in accordance with the present invention, the depth of the serrations is no more than approximately onehalf the depth of those produced in surface deep scoring. This minimizes the amount of seaming necessary to finish the edge. Second, the presence of significant wing is eliminated. The lateral damage produced by a pseudosubsurface score is, in fact, about 1/10th to about 1/5th of the lateral damage produced by a surface score. Third, the presence of glass chips that have heretofore plagued cutting processes is minimized and almost eliminated. This eliminates the necessity of removing these chips and the surface damage to the glass caused by the presence of the chips. Fourth, it has been common to use cutting oil to reduce surface damage during scoring, to provide an improved surface score and to protect the score from atmospheric moisture so that it will not heal. With the present invention, since the score does not come in contact with the atmosphere, there is no need to protect it from atmospheric moisture and therefore no need to use cutting oil. This eliminates the problem of removing the cutting oil after the score has been applied. Fifth, a pseudosubsurface does not heal when left standing, as does a surface score. When a score heals, the stress produced by the scoring action disappears and the cut is more difficult to open. The present invention allows one to score the glass and store it for a period of time before snapping it. Sixth, due to the fact that there is no significant surface damage to the glass, the scoring wheel is subjected to less of an abrasive action and wheel is increased. Finally, while the above characteristics are substantially common to both pseudosubsurface and subsurface scores, pseudosubsurface scores are of an order of magnitude of 5 to 10 times easier to snap and are of an order of magnitude of 1.5 to 2 times easier to initiate running than are subsurface scores due to the weakened tensile strength of the zone of glass 8 in a pseudosubsurface score.

As is the case with surface and subsurface scores, the depth of a pseudosubsurface score is directly related to the pressure applied to the scoring wheel. As pressure is increased, the depth of the pseudosubsurface score also increases. However, for a wheel of any given diameter, there is a practical limit to the amount of pressure that can be applied. If too much pressure is applied to the cutting wheel, excessive wing appears. By "excessive" or "significant" wing, it is meant that a substantial amount of seaming (more than about 6 millimeters) is necessary to remove the wing. For example, with surface scores, a normal cutting wheel of about 6 millimeters in diameter with a cutting angle of 160° has a maximum score depth of about 1 millimeter in 12-millimeter glass at a force of about 18 kilograms. If the force is increased, a crude fracture and significant wing result without any increase in score depth. In order to increase the depth of the surface score, without producing significant edge defects, it has been necessary to increase the diameter of the wheel. As the diameter of the wheel is increased, it is possible to obtain a score of greater depth by increasing the foroce applied to the wheel. For example, a high friction cutting wheel having a diameter of 19 millimeters, with a cutting angle of 160°, will produce a surface score depth of about 2.3 millimeters with a force of about 80 kilograms, without significant surface defects, if the wheel is moved at more than about 20 centimeters per second. If the force alone is increased, the depth of the surface score will not increase, and surface defects and perhaps a crude fracture will result.

With a high friction cutting wheel having a diameter of 25 millimeters and a cutting angle of 160°, a 90-kilogram force will produce a maximum surface score depth of 2.5 millimeters with no significant surface defects if the wheel is moved at more than 20 centimeters per second. with a high friction cutting wheel having a diameter of 32 millimeters and a cutting angle of 160°, a force of 105 kilograms will produce a maximum surface score depth of 3.1 millimeters without any significant surface defects if the wheel is moved at more than 20 centimeters per second. In each of these cases, increasing the applied force beyond the stated maximums creates surface defects that may be removed only with significant amounts of seaming, without any increase in score depth. Note that each example states that the wheel speed should be at least about 20 centimeters per second. At speeds less than this, either pseudosubsurface or subsurface scores are produced. This probably occurs because the abrasive forces on the glass are less at lower wheel speeds.

These results seem to indicate that the diameter of the cutting wheel and the force applied thereto should be increased indefinitely. It is to be noted, however, that with surface scoring, as the diameter of the wheel and the force applied thereto are increased, the length of the wings also increases. This increases the amount of seaming necessary to finish the edge. Ordinarily, it is not practical to have to seam more than about 3 millimeters or perhaps, in extreme cases, 6 millimeters in a direction that is transverse to the score. Using a cutting wheel having a diameter of 32 millimeters with a cutting angle of 160°, it is necessary to seam about 3 millimeters from the edge. This is the maximum amount practical.

If a high friction cutting wheel having a 163° cutting angle and a diameter of 12.7 millimeters applies a force of 80 kilograms to a piece of glass 19 millimeters in thickness, a pseudosubsurface score is produced that begins approximately 0.01 millimeter from the top surface and extends for approximately 1.5 millimeters into the thickness of the glass if the wheel is moved at less than about 25 centimeters per second. As the force is increased, significant surface defects develop without any increase in score depth. If a high friction wheel having a diameter of 19 millimeters and a cutting angle of 163° applies a force of 175 kilograms to a piece of glass 19 millimeters in thickness, it is possible to produce a pseudosubsurface score that starts approximately 0.01 millimeter from the glass surface and extends for approximately 2.5 millimeters if the wheel is moved at less than about 25 centimeters per second. If a high friction wheel having a diameter of 50 millimeters and a cutting angle of 163° applies a force of 275 kilograms to a piece of glass one inch in thickness, a pseudosubsurface score is created that begins approximately 0.01 millimeter from the glass surface and extends for approximately 3 millimeters if the wheel is moved at less than about 40 centimeters per second. With high friction wheels, surface deep scores, and sometimes spotty pseudosubsurface deep scores are obtained at speeds above those stated.

As in the case of surface deep scoring, these resultls seem to indicate that the diameter of the scoring wheel and the force applied thereto should be increased indefinitely. In this case, unlike surface scoring, it is true. With pseudosubsurface deep scoring, as the scoring wheel diameter increases, it is possible to increase pseudosubsurface score depth, without creating long wings that would necessitate excessive seaming. There does not appear to be any limit other than the fact that, when the score itself must be seamed, the greater its depth, the more seaming that will be necessary. This is easier, however, than seaming lateral wings. When the socre does not require seaming, on the other hand, the practical limit is when the score begins to self propagate under the wheel.

To summarize a high friction wheel having a cutting angle of from approximately 155° to approximately 165°, and preferably about 157° to 163°, and a diameter of at least approximately 12 millimeters, and preferably between approximately 18 and 200 millimeters, may be used to produce a pseudosubsurface deep score with forces of between approximately 30 and 900 kilograms. With cutting wheels having cutting angles between 155° and 165°, it is possible to produce both surface and pseudosubsurface deep scores by varying either the force that is applied to the cutting wheel or the speed with which the cutting wheel is advanced.

Using a cutting wheel with a perfectly blunt cutting angle (i.e., 180°), the glass being worked upon is in compression throughout its thickness beneath the cutting wheel. If the cutting angle be reduced, the glass will no longer be in compression throughout its entire thickness beneath the wheel, but rather, a tension zone will be created adjacent the surface being scored. It is known that glass fails more easily in tension than in compression. For a cutting wheel having a given cutting angle, such as 160°, the location of the tension zone (which corresponds to the location of the score) may be moved by varying the force that is applied to the cutting wheel. For example, if a high friction cutting wheel has a diameter of 19 millimeters and a cutting angle of 160°, it may be used to apply either a surface deep score or a pseudosubsurface deep score in a piece of flat glass that is 19 millimeters thick. If a force of approximately 60 kilograms is applied to said wheel, a zone of tension is created adjacent to the top surface of the glass, and a surface deep score will be created at speeds greater than about 25 centimeters per second. At speeds below this, it is likely that a pseudosubsurface score will result. If a force of approximately 120 kilograms is applied to the same wheel, the zone of tension is further beneath the glass surface and a surface deep score will result only at wheel speeds in excess of about 30 centimeters per second. This illustrates that the force applied to a high friction cutting wheel and the speed with which it is moved may determine whether a surface or a pseudosubsurface deep score results.

The exterior surface of the cutting wheel should preferably be finished so that it has at least a No. 10 finish. If the surface of the wheel is too rough, local stresses may be created in the glass, thereby damaging its surface.

If the glass is rigidly supported on a longitudinally extending knife edge or is transported across a wheel 80 (FIG. 10) provided with a peripheral knife edge surface located directly beneath the intended path of the pseudosubsurface score during the scoring operation, tension within the glass is increased and it becomes easier to create a pseudosubsurface score. It is important that the knife edge provide rigid backing support and be located exactly beneath the intended path of the pseudosubsurface score 10 or the tensile stresses about the path will not be uniform. If it is impractical to align a knife edge with the intended path, a narrow flat plate or narrow cylindrical backing wheel may be used, such as an aluminum plate or wheel approximately 12.7 millimeters in width. This does not provide tensile stresses within the glass of the same magnitude as those produced with a knife edge, but it is relatively easier to align the narrow plate or wheel with the intended path of the pseudosubsurface and the tensile stresses obtained with a narrow plate or wheel are often sufficient.

Generally, the dpeth of a score or crack, whether surface or pseudosubsurface, should be such as to weaken the glass sufficiently so that a bending moment applied about the score or crack will cause the glass to fracture with a resulting edge that is smooth, strong, straight and perpendicular to the major surfaces of the piece of glass. Table A shows the preferred minimum depths of scores or cracks for various glass thicknesses.

Table A

| Glass Thickness, millimeters | Preferred Minimum Depth of Score or Crack, millimeters |
|---|---|
| 6 | .75 |
| 12 | 1.5 |
| 19 | 2.3 |
| 25 | 3 |

Referring to Table B, there is shown the ranges of force that may be applied to 163° cutting wheels, such as wheel 14, of various diameters, and the depths of subsurface deep scores that result. The table also indicates the approximate maximum speeds with which a high friction wheel may be advanced to insure that the score is pseudosubsurface.

Table B

| Wheel Diameter, millimeters | Range of Force, kilograms | Range of Depth of Pseudosubsurface Score, millimeters | Maximum Scoring Speed centimeters/second |
|---|---|---|---|
| 12.7 | 30 – 115 | 1.5 – 2.0 | 25 |
| 19 | 135 – 175 | 1.5 – 2.5 | 25 |
| 31 | 180 – 200 | 1.7 – 2.7 | 30 |
| 50 | 200 – 275 | 2.0 – 3.0 | 40 |
| 100 | 300 – 900 | 2.5 – 4.0 | 50 |

Thus far, scores produced by a wheel, such as wheel 14, have been discussed in great detail. It should be understood that with such a wheel there can be a relatively large frictional force between the wheel and its holder. Using a wheel with an integral shaft 24' and ball bearings 27, such as wheel 14' in FIG. 2A, eliminates most of the frictional force between the wheel and its holder. This can produce a subsurface crack that is of even higher quality than a pseudosubsurface score, since serrations are essentially eliminated. The data in Table B is applicable to subsurface cracks made with low friction wheels, except for the scoring speeds listed in the final column. With a low friction wheel, it is possible to move the wheel approximately four times faster than with a high friction wheel before surface scores result.

Figure 10:
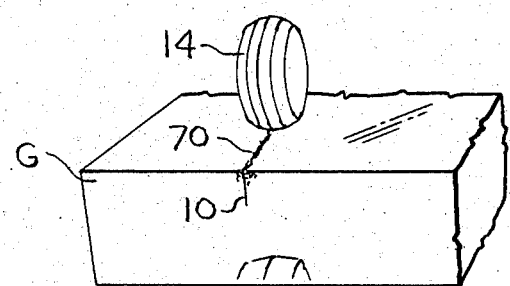
FIG. 10 is a diagrammatic view of a piece of glass with a pseudosubsurface score made by a cutting wheel with a relatively large amount of friction between the wheel and its holder.

Referring to FIG. 10, there is shown a view of a pseudosubsurface score 10 made with a high friction wheel in a piece of glass G. Indentation 11 has been omitted, and score 10 and defects 70 have been exaggerated, all for the sake of clarity. The defects 70 are probably caused, at least in part, by the relatively high friction between the wheel and its holder. With the higher friction, there would be a tendency for the wheel to slide rather than rool. This would increase the compressive stresses immediately in front of the wheel and the tensile stresses immediately after the wheel. The increased tensile stress could cause the small fractures, such as defects 70, to be formed. With a wheel, such as wheel 14', having a low frictional force between itself and its holder, the tendency for the wheel to slide is minimized. This reduces the tensile stress behind the wheel and defects 70 do not appear. If the speed of advance of the low friction wheel is increased, for example, to at least approximately 1 meter per second for wheels having a diameter of 12.7 millimeters, or 2 meters per second for wheels having a diameter of 100 millimeters, or if forces in excess of those listed in Table B are used, it is likely that a surface will result from the low friction wheel.

An important and interesting positive distinction between whether a pseudosubsurface score 10 or a subsurface score 10' is being produced is that by normal vision one can readily observe that a pseudosubsurface score will reflect and refract ordinary incident light, whereas a subsurface score will not. When viewing an unsevered pseudosubsurface scored piece in ordinary light, the score or fissure area is readily apparent as a shiny line or, more precisely, a shiny area beneath the surface of the glass along the path of the score. When viewing a subsurface scored piece under like conditions on the other hand, the fissure area or area of the subsurface score is totally incapable of being seen. It is though that with a pseudosubsurface score the damaged zone of glass 8 is actually holding the score or fissure open, i.e., there is a slight separation between the opposed faces of the fissure, such that light is refracted and reflected therefrom. With a subsurface score, apparently the fissure is held closed or sufficiently closed by the adjacent zones of undamaged or substantially undamaged glass so that ordinary incident light cannot be observed being refracted and reflected therefrom.

Figure 11:
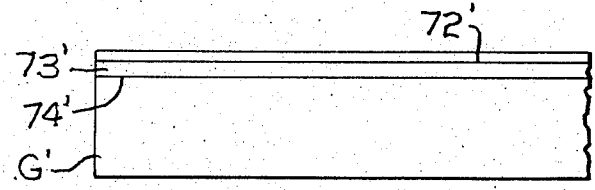
FIG. 11 is an elevation view of an edge of a piece of glass cut in accordance with a procedure that uses a wheel with a relatively small amount of friction between the wheel and its holder.

Referring to FIG. 11, there is shown a cut edge of a piece of glass G' that was severed with a subsurface crack, using a low friction wheel, such as wheel 14'. It should be noted that a surface defect, such as a hand nick, should be placed in the glass along the intended path of cut before the subsurface crack is initiated. This functions as a starting point for the subsurface crack.

Figure 6:
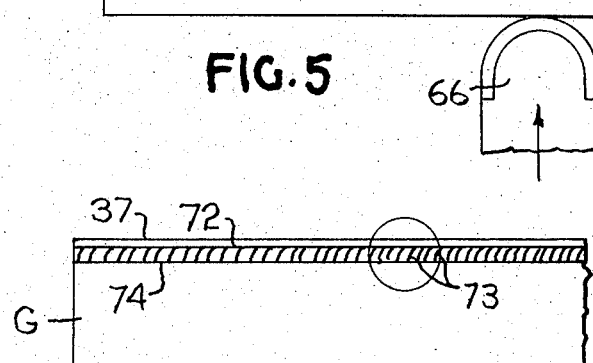
FIG. 6 is an elevation view of an edge of a piece of glass cut in accordance with the present invention using a wheel with a relatively large amount of friction between the wheel and its holder.
Figure 7:
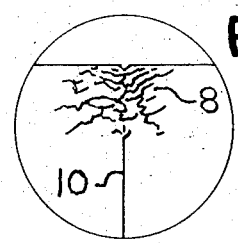
FIG. 7 is an enlarged view of the encircled area in FIG. 6.

The edge illustrated in FIG. 11 is similar to the one shown in FIG. 6, one difference being the fissure area 73' is very smooth with little or no undulations or serrations between marking 72' and marking 74' in FIG. 11. This is because it is probably the defects 70 that cause the undulations or serrations, and when defects 70 are eliminated, the serrations are also eliminated.

The low friction wheel 14' would appear to be more desirable than the high friction wheel 14, since the low friction wheel produces a cut edge with little or no undulations or serrations at a speed approximately four times that of a high friction wheel. However, it should be noted that all pseudosubsurface as well as all subsurface scores and cracks must be initiated at a surface of the glass. With a pseudosubsurface score 10 made with high friction wheel 14, defects 70 function as the starting point for the score. When there are no defects 70, such as with a subsurface crack 10', it is necessary to place a surface defect in the glass to initiate the subsurface crack. Since the surface defects with a high friction wheel may be kept small (and easily removed with light seaming), this type of wheel is preferred unless high scoring speeds are necessary. Moreover, as mentioned above, pseudosubsurface scores are easier to open or snap than are subsurface scores.

The fact that undulations or serrations 73" protrude from the edge of the piece of glass in FIG. 8 about twice the amount of undulated or serrations 73 in FIG. 6, makes the edge shown in FIG. 6 more desirable than the edge shown in FIG. 8. Further, the lack of undulations or serrations at 73' makes the edge in FIG. 11 even more desirable. The fact that cut edges shown in FIGS. 6 and 11 were made with pseudosubsurface and surface discontinuities, respectively, is significant in itself, since cutting oil and healing are eliminated with both pseudosubsurface and subsurface cracks and scores. Accordingly, if one obtains a discontinuity having the physical characteristics of the score shown in FIG. 6 or of the crack shown in FIG. 11, except that the discontinuity intersects the surface of the piece, it is still preferable to the score shown in FIG. 8. It is important that a score or crack be of suitable quality such that a fracture may be propagated with little or no edge damage to the piece of glass so that seaming may be minimized. The edges shown in FIGS. 6, 8 and 11 are all of such quality, but serrations 73 require even less seaming than serrations 73", and area 73' requires even less seaming than serrations 73.

With control of various parameters, such as wheel diameter, cutting angle, force applied to the wheel, etc., it is possible to produce a crack or a score that is beneath the major surfaces of the glass. It should be kept in mind, however, that there may be situations where a crack or a score contacts a major surface of the piece of glass but retains the physical characteristics of a subsurface crack or score, respectively.

U.S. application Ser. No. 68,305, filed Aug. 31, 1970, by David A. Bier et al, since replaced by U.S. application Ser. No. 265,923, now U.S. Pat. No. 3,756,104, discloses that in the cutting of blanks, such as windshields, it is advantageous to increase the depth of a score at the corners of the blank. In such a case, pseudosubsurface scores may be used to outline the entire blank except for the corners where a parameter such as speed may be changed to yield a surface score, which weakens the glass to a greater extent, at the corners.

It is anticipated that the present invention may be used to cut edges other than straight edges. Further, bent or other forms of flat glass may also be cut as herein contemplated. In addition, the invention may also be practiced in cutting glass objects such as thick cylinders, rods and tubes or to cut other refractories, such as ceramics, e.g., Monofrax ceramics sold by the Carborundum Corporation, the glass-ceramics, e.g., Hercuvit glass-ceramics sold by PPG Industries, Inc.

While the invention has thus far been described in connection with cutting pieces of flat glass, it will be apparent to one skilled in the art that it is not limited to such. For example, the invention may be practiced in a wareroom to cut a continuous ribbon of glass, either longitudinally or transversely.

Having now fully disclosed the invention, what I claim is as follows:

1. In a method of cutting a refractory material selected from the group consisting of glasses, ceramics and glass-ceramics wherein a scoring force is applied to a scoring tool on a surface of said material, relative movement is imparted between said tool and said material to form a score in said material along an intended path of cut and, thereafter, force is applied to said material to sever it along said score and intended path of cut, the improvement comprising:

applying said scoring force to a rotary scoring tool having a continuous cutting edge with an effective cutting angle of from about 150° to less than 180° in an amount and at a rate of relative movement between said tool and said material sufficient to produce a pseudosubsurface score in said material extending a substantial distance into said material and substantially perpendicular to and along said path, a substantial portion of said score along the length of its tip being spaced from the adjacent surface of the material by a microscopic zone of damaged but substantially spall- and wing-free material, and projecting said score deeper into the thickness of said material after said score is produced.

2. A method fo cutting as defined in claim 1, wherein said score is produced in a piece of flat glass.

3. A method of cutting as defined in claim 1, wherein said score is produced in a piece of ceramic material.

4. A method of cutting as defined in claim 1, wherein said score is produced in a piece of glass-ceramic material.

5. A method of cutting as defined in claim 2, further including the step of:

finishing upper and lower portions of the cut edge produced along said path of cut.

6. A method of cutting as defined in claim 5, wherein said finishing comprises seaming said upper and lower portions of said cut edge.

7. A method of cutting as defined in claim 2, wherein said score is projected by applying a bending moment about said score.

8. A method of cutting as defined in claim 2, wherein said score is projected by applying heat along the length of said score.

9. A method of cutting as defined in claim 2, wherein said score is projected by applying heat along the length of said score followed by applying a bending moment about said score.

10. A method of cutting as defined in claim 2, further including the step of:

placing a narrow member against the bottom surface of said glass and directly beneath the intended path before the score is produced.

11. A method of cutting as defined in claim 10, wherein said narrow member is a wheel.

12. A method of cutting as defined in claim 11, wherein said wheel has a knife-edge surface formed on its periphery.

13. A method of cutting as defined in claim 2, wherein said score is produced by forcing a wheel having a diameter of from approximately 18 millimeters to approximately 200 millimeters against a major surface of the glass.

14. A method of cutting as defined in claim 2, wherein said score is produced by forcing a wheel having a diameter of at least approximately 12 millimeters against a major surface of the glass.

15. A method of cutting as defined in claim 14, wherein said wheel has a cutting angle of approximately 163°.

16. A method of cutting as defined in claim 14, wherein said wheel has a cutting angle of from about 150° to about 170°.

17. A method of cutting as defined in claim 16, wherein said wheel produces said score at a force of from approximately 30 kilograms to approximately 900 kilograms.

18. A method of cutting as defined in claim 15, wherein said wheel produces said score at a force of at least approximately 30 kilograms.

19. A method of cutting as defined in claim 14, wherein said wheel travels along the intended path at a speed of up to approximately 25 centimeters per second.

20. A method of cutting as defined in claim 14, wherein said wheel travels along the intended path at a speed up to approximately 30 centimeters per second.

21. A method of cutting as defined in claim 14, wherein said wheel travels along the intended path at a speed up to approximately 40 centimeters per second.

22. A method of cutting as defined in claim 14, wherein said wheel travels along the intended path at a speed up to approximately 50 centimeters per second.

23. A method of cutting as defined in claim 7, further including the step of:
placing a narrow member against the bottom surface of said glass and directly beneath said score before the bending moment is applied to place the glass in tension.

24. In a method of scoring a piece of glass wherein a scoring force is applied to a scoring wheel on a major surface of said glass and relative movement is imparted between said wheel and said glass to form a score in said glass along an intended path of cut, the improvement comprising:
positioning a scoring wheel having an effective cutting angle of from about 150° to less than 180° on a major surface of said piece of glass,
applying a scoring force to said wheel in a direction substantially perpendicular to said major surface sufficient to produce a pseudosubsurface score, said force being within the range of from approximately 30 kilograms to approximately 900 kilograms, and
advancing said wheel along the intended path of said score at a rate of relative movement between said wheel and said glass of up to approximately 50 centimeters per second to produce a said score below said path and spaced from said surface by a zone of weakened but substantially spall- and wing-free glass.

25. A method scoring as defined in claim 24, wherein said wheel has a cutting angle of from approximately 155° to approximately 170°.

26. In a method of producing a cut edge on a piece of glass wherein a scoring force is applied to a scoring wheel on a surface of said piece of glass, relative movement is imparted between said wheel and said glass to form a score in said glass along an intended path of cut and, thereafter, force is applied to said material to sever it along said score and intended path of cut, the improvement comprising:
applying said scoring force to a scoring wheel having an effective cutting angle of from about 150° to less than 180° in an amount and at a rate of relative movement between said wheel and said glass sufficient to produce a pseudosubsurface score in said glass extending a substantial distance into said glass and substantially perpendicular to and along said path, a substantial portion of said score along the length of its tip being spaced from the adjacent surface of the glass by a zone of substantially spall- and wing-free glass, the area of said score being visually apparent in ordinary light, and
projecting said score deeper into the thickness of said glass after said score is produced.

27. In a method of scoring a refractory material selected from the group consisting of glasses, ceramics and glass-ceramics wherein a scoring force is applied to a scoring tool on a surface of said material and relative movement is imparted between said tool and said material to form a score in said material along an intended path of cut, the improvement comprising:
applying said scoring force to a rotary scoring tool having a continuous cutting edge with an effective cutting angle of from about 150° to less than 180° in an amount and a rate of relative movement between said tool and said glass sufficient to produce a pseudosubsurface score in said material extending substantially perpendicular to and along said path, a substantial portion of said score along the length of its tip being spaced from the adjacent surface of the material by a microscopic zone of damaged but substantially spall- and wing-free glass.

28. In a method of scoring a piece of glass wherein a force is applied to a scoring wheel on a surface of said piece of glass and relative movement is imparted between said wheel and said glass to form a score in said glass along an intended path of cut, the improvement comprising:
applying said force to a scoring wheel having an effective cutting angle of from about 150° to less than 180° in an amount and at a rate of relative movement between said wheel and said glass sufficient to produce a pseudosubsurface score in said glass extending a substantial distance into said glass and substantially perpendicular to and along said path, a substantial portion of said score along the length of its tip being spaced from the adjacent surface of the glass by a zone of substantially spall- and wing-free glass, the area of said score being visually apparent in ordinary light.

29. In a method of weakening glass along an intended path of cut wherein a scoring force is applied to a scoring tool on a surface of said glass and relative movement is imparted between said tool and said glass to form a score in said glass along said intended path of cut, the improvement comprising:
applying said scoring force to a rotary scoring tool having a continuous cutting edge with an effective cutting angle of from about 150° to less than 180° in an amount and at a rate of relative movement between said tool and said glass sufficient to produce a pseudosubsurface score in the glass under a major surface thereof, said score being nearest to said major surface but spaced therefrom by an intervening zone of substantially spall- and wing-free glass, the area of said score being visually apparent in ordinary light and said major surface of said glass being substantially smooth and unblemished.

30. A method of weakening glass as defined in claim 29, wherein said intervening zone is a minute zone of weakened glass extending at least about 0.025 millimeters in depth and up to about 0.5 millimeters in width.

31. A method of weakening glass as defined in claim 29, wherein said intervening zone is a minute zone of weakened glass extending up to about 0.0125 millimeters in depth and up to about 0.25 millimeters in width.

32. A method of weakening glass as defined in claim 29, wherein said intervening zone is between about 0.01 and 0.02 millimeters in depth.

33. A product produced in accordance with the method of claim 1.

34. A product produced in accordance with the method of claim 27.

* * * * *

UNITED STATES PATENT OFFICE
CERTIFICATE OF CORRECTION

Patent No. 3,865,673          Dated February 11, 1975

Inventor(s) Robert P. DeTorre

It is certified that error appears in the above-identified patent and that said Letters Patent are hereby corrected as shown below:

After "Assignee" delete "Moline Limited, London, England" and substitute therefor —PPG Industries, Inc., Pittsburgh, Pa.—

Column 1, line 44, "57,584" should be —57,574—

Column 1, line 49, "4,795,502" should be —3,795,502—

Column 4, line 6, "socre" should be —score—

Column 5, line 12, "surface" should be —surfaces—

Column 5, line 25, after "pseudosubsurface" insert —deep—

Column 6, line 21, "0.0215" should be —0.0125—

Column 6, line 35, "line" should be —lines—

Column 8, line 14, after "places the" insert —top—

Column 10, line 4, after "pseudosubsurface" insert —score—

Column 10, line 12, after "wheel" insert —life—

Column 10, line 42, "foroce" should be —force—

Column 11, line 46, "resultls" should be —results—

Column 11, line 58, "socre" should be —score—

Column 12, line 60, after "pseudosubsurface" insert —score—

Column 12, line 62, "dpeth" should be —depth—

Column 12, line 66, "resulting" should be —resultant—

Column 14, line 1, after "surface" insert —score—

Column 14, line 50, after "eliminated the" insert —undulations or—

Claim 2, Column 16, line 1, "fo" should be —of—

Claim 25, Column 17, line 1, after "method" insert —of—

Signed and sealed this 29th day of April 1975.

(SEAL)
Attest:

RUTH C. MASON
Attesting Officer

C. MARSHALL DANN
Commissioner of Patents
and Trademarks